(12) United States Patent
Dugas et al.

(10) Patent No.: US 11,098,577 B2
(45) Date of Patent: Aug. 24, 2021

(54) METHOD AND APPARATUS TO DETECT GAS INFLUX USING MUD PULSE ACOUSTIC SIGNALS IN A WELLBORE

(71) Applicants: Bryan Dugas, Breaux Bridge, LA (US); John D. MacPherson, Celle (DE)

(72) Inventors: Bryan Dugas, Breaux Bridge, LA (US); John D. MacPherson, Celle (DE)

(73) Assignee: BAKER HUGHES OILFIELD OPERATIONS LLC, Houston, TX (US)

(*) Notice: Subject to any disclaimer, the term of this patent is extended or adjusted under 35 U.S.C. 154(b) by 57 days.

(21) Appl. No.: 16/431,390

(22) Filed: Jun. 4, 2019

(65) Prior Publication Data

US 2020/0386095 A1     Dec. 10, 2020

(51) Int. Cl.
*E21B 47/107*     (2012.01)
*G01N 29/024*     (2006.01)
*G01N 29/22*     (2006.01)

(52) U.S. Cl.
CPC .......... *E21B 47/107* (2020.05); *G01N 29/024* (2013.01); *G01N 29/222* (2013.01); *G01N 2291/011* (2013.01); *G01N 2291/012* (2013.01)

(58) Field of Classification Search
CPC . E21B 47/107; E21B 47/10; G01N 2291/012; G01N 29/024; G01N 2291/011; G01N 29/222
See application file for complete search history.

(56) References Cited

U.S. PATENT DOCUMENTS

| 4,299,123 | A | * | 11/1981 | Dowdy | ................. | E21B 47/107 |
| | | | | | | 73/152.22 |
| 4,733,233 | A | | 3/1988 | Grosso et al. | | |

(Continued)

FOREIGN PATENT DOCUMENTS

| CN | 106640051 A | 5/2017 |
| EP | 0671547 A1 | 9/1995 |

(Continued)

OTHER PUBLICATIONS

M. Sc. Mohammed Ali Namuq; "Simulation and modeling of pressure pulse propagation in fluids inside drill strings"; Faculty of Geosciences, Geoengineering and Mining of the Technische Universitat Bergakademie Freiberg; Thesis, Feb. 20, 2013; 114 pages.

(Continued)

*Primary Examiner* — Brad Harcourt
(74) *Attorney, Agent, or Firm* — Cantor Colburn LLP

(57) ABSTRACT

A method and apparatus for determining a gas influx into a wellbore. A work string defining an inner bore area and an annulus area, with a pair of inner bore sensors in the inner bore and a pair of annulus sensors in the annulus. A processor sets a gas influx alarm limit based on a steady-state value of an acoustic parameter measured by the pair of inner bore sensors in an absence of a gas influx and a steady-state value of the acoustic parameter measured by the annulus sensors in the absence of the gas influx. The processor determines a gas influx in the wellbore when a subsequent value of the acoustic parameter is outside of the alarm limit and performs an action at the work string to counteract the gas influx in the wellbore.

17 Claims, 4 Drawing Sheets

(56) References Cited

U.S. PATENT DOCUMENTS

| | | |
|---|---|---|
| 5,154,078 A | 10/1992 | Codazzi |
| 5,163,029 A | 11/1992 | Bryant et al. |
| 5,222,048 A | 6/1993 | Grosso et al. |
| 5,272,680 A | 12/1993 | Stone et al. |
| 5,275,040 A * | 1/1994 | Codazzi ................ E21B 21/08 73/152.22 |
| 5,850,369 A | 12/1998 | Rorden et al. |
| 8,122,975 B2 | 2/2012 | Belcher et al. |
| 8,689,904 B2 | 4/2014 | Coates et al. |
| 8,794,062 B2 | 8/2014 | Difoggio et al. |
| 9,309,762 B2 | 4/2016 | MacDonald et al. |
| 2003/0026167 A1 | 2/2003 | Hahn et al. |
| 2014/0240140 A1 | 8/2014 | Switzer et al. |
| 2018/0328159 A1* | 11/2018 | Mandava ................ E21B 47/10 |

FOREIGN PATENT DOCUMENTS

| | | |
|---|---|---|
| WO | 0036273 | 6/2000 |
| WO | 2015116504 A1 | 8/2015 |
| WO | 2015190932 A1 | 12/2015 |

OTHER PUBLICATIONS

Notification of Transmittal of the International Search Report and the Written Opinion of the International Searching Authority, or the Declaration; PCT/US2050/035060; dated Sep. 11, 2020; 10 pages.

* cited by examiner

METHOD AND APPARATUS TO DETECT GAS INFLUX USING MUD PULSE ACOUSTIC SIGNALS IN A WELLBORE

BACKGROUND

In the resource recovery industry, a drill string is used to drill a wellbore in a formation. A drilling fluid or drilling mud is sent downhole through an inner bore of the drill string to exit the drill string at a drill bit located at a bottom end of the of the drill string. The drilling mud then travels uphole, carrying drilled rock cuttings uphole to a surface location. During drilling, it is possible for a gas from the formation to enter the wellbore. A large enough influx of gas can cause severe disruption to the drilling process and to the flow of the drilling mud. Therefore, there is a need to be able to monitor and detect a gas influx in a wellbore.

SUMMARY

In one embodiment, a method of determining a gas influx into a wellbore is disclosed. A gas influx alarm limit is set at a processor based on a steady-state value of an acoustic parameter of fluid in an inner bore of a work string in an absence of a gas influx and a steady-state value of the acoustic parameter of fluid in annulus outside of the work string in the absence of a gas influx. A gas influx in the wellbore is determined at the processor when a subsequent value of the acoustic parameter is outside of the alarm limit. The processor performs an action at the work string to counteract the gas influx in the wellbore.

In another embodiment, an apparatus for determining a gas influx into a wellbore. The apparatus includes a work string defining an inner bore area and an annulus area, a pair of inner bore sensors in the inner bore, a pair of annulus sensors in the annulus, and a processor configured to set a gas influx alarm limit based on a steady-state value of an acoustic parameter measured by the pair of inner bore sensors in an absence of a gas influx and a steady-state value of the acoustic parameter measured by the annulus sensors in the absence of the gas influx, determine a gas influx in the wellbore when a subsequent value of the acoustic parameter is outside of the alarm limit, and perform an action at the work string to counteract the gas influx in the wellbore.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
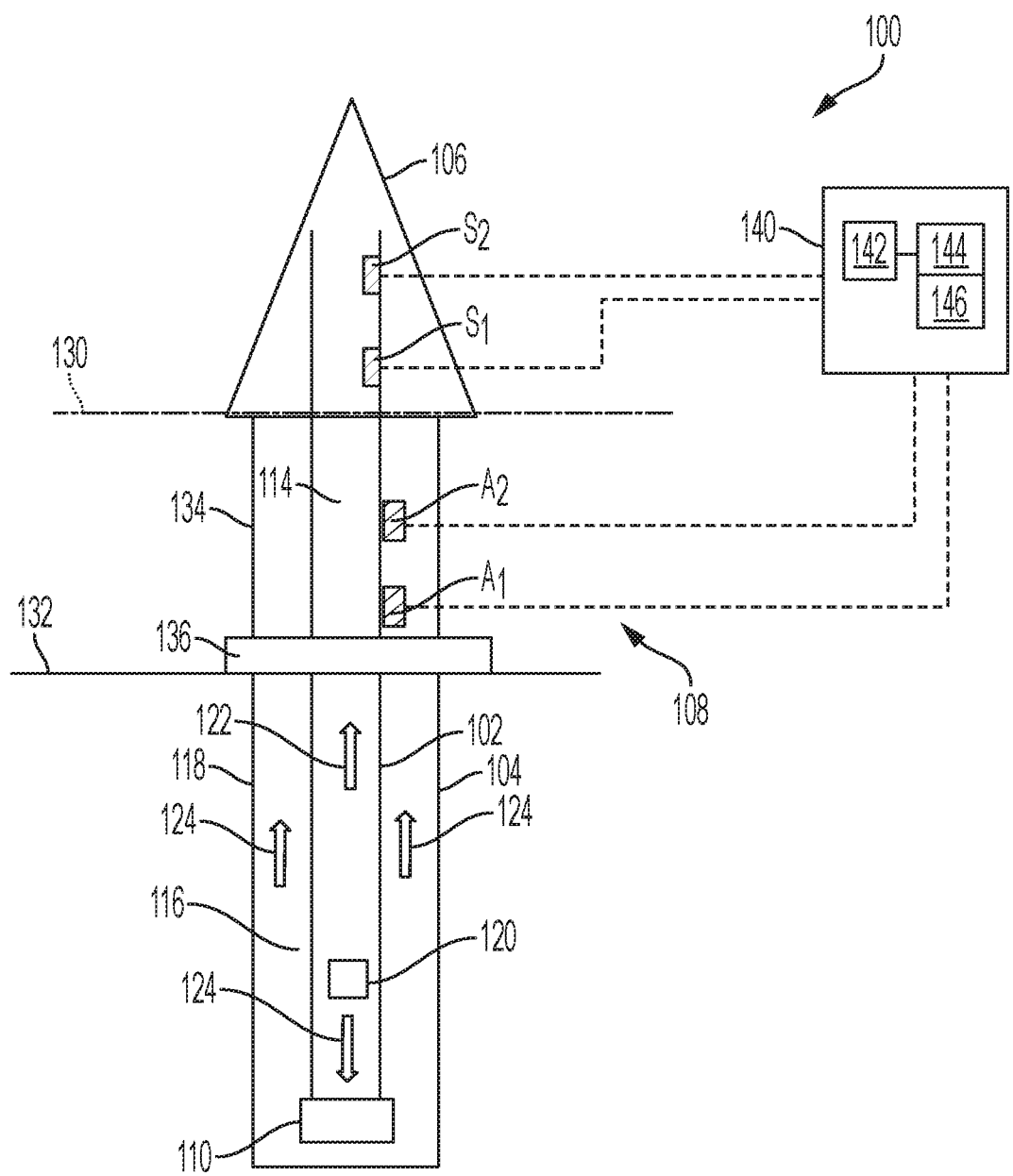
FIG. 1, an illustrative drilling system for drilling a wellbore and determining a gas influx in the wellbore is shown.

Referring to FIG. 1, an illustrative drilling system 100 for drilling a wellbore and determining a gas influx in the wellbore is shown. The drilling system 100 includes a drilling rig 106 at a sea surface location 130 and a riser 134 that extends from the drilling rig 106 to a seabed 132. A drill string 102 extends from the drilling rig 106 through the riser 134 and into a wellbore 104. A drill bit 110 at a bottom end of the drill string 102 drills the wellbore 104 through formation 108. A pump (not shown) pumps drilling mud 112 downhole through an inner bore 114 of the drill string 102. The drilling mud 112 exits the drill string 102 through the drill bit 110. The drilling mud 112 then returns to the surface through an annulus 116 between the drill string 102 and a wall 118 of the wellbore 104 as well as between the drill string 102 and the riser 134. A blow-out preventer (BOP) 136 is generally located at the seabed 132 and the drill string 102 extends through the BOP 136. While discussed as a drill string 102 for explanatory purposes, the string can be any type of work string.

A pulser 120 is located at a downhole location within the inner bore 114 of the drill string 102. When activated, the pulser 120 generates a positive pressure pulse 122 and a negative pressure pulse 124. The positive pressure pulse 122 travels uphole through the inner bore 114 at a speed of sound in the fluid in the inner bore 114. The negative pressure pulse 124 travels downhole through the inner bore 114 to pass out of the drill string 102 at the drill bit 110, and then travels uphole through the annulus 116 at a speed of sound in the fluid in the annulus 116.

The drill string 102 includes a first inner bore pressure sensor S1 and a second inner bore pressure sensor S2 located in the inner bore 114 at an uphole location. The first inner bore pressure sensor S1 and the second inner bore pressure sensor S2 are separated axially from each other by a known distance. The drill string 102 further includes a first annular pressure sensor A1 and a second annular pressure sensor A2 which are located in the annulus. The first annular pressure sensor A1 and the second annular pressure sensor A2 are separated axially from each other by a known distance. The sensors S1, S2, A1 and A2 are in communication with a control unit 140. The control unit 140 includes a processor 142 and a memory storage device 144. The memory storage device 144 includes programs and instructions 146 that when accessed by the processor 142 cause the processor 142 to perform various actions disclosed herein.

The annular transducers (A1 and A2) can be positioned close to the sea floor 132 or on the subsea BOP stack 136. Alternatively, the annular transducers can be placed on a bell nipple of a surface BOP stack. Since the length of the acoustic path between the annular pressure sensors (A1 and A2) and the acoustic pulser 120 is less than the length of the acoustic path between the inner bore pressure sensors (S1 and S2) and the acoustic pulser 120, the annular pressure sensors (A1 and A2) see the negative pressure pulse 124 before the inner bore sensors (S1 and S2) see the positive pressure pulses 122.

The inner bore sensors (S1 and S2) and the annulus sensors (A1 and A2) can measure various properties of the pressure pulses 122 and 124, respectively, in order to determine acoustic parameters in the inner bore 114 and the annulus 116, respectively, thereby determining a gas influx into the wellbore. The acoustic parameters can include, but are not limited to, a signal attenuation, a phase difference in an acoustic signal, an arrival time of the acoustic signal at a sensor, and a sound velocity in the fluid. The acoustic parameters of the fluid differ between the inner bore 114 and the annulus 116 due, at least in part, to the difference in the composition of the fluids in their respective acoustic paths. For example, the fluid in the inner bore 114 is composed of drilling mud having a relatively consistent composition, while fluid the annulus 116 is composed of drilling mud, the cuttings from drilling and any influx of gas or liquids from the formation 108, which changes its composition as the proportions of these constituents in the annulus 116 change.

The measurements can be used to define a threshold for determining an influx of gas into the annulus. For example, an acoustic parameter of the fluid in the inner bore can be measured at inner bore sensors S1 and S2 in the absence of a gas influx in order to determine a steady-state value for the acoustic parameter of the fluid in the inner bore. Similarly, the acoustic parameter for the fluid in the annulus can be measured at annulus sensors A1 and A2 in the absence of a gas influx in order to determine a steady-state value for the acoustic parameter of the fluid in the annulus. These steady-state values can be compared to each other in order to establish a gas influx alarm threshold. In one embodiment, the gas flux alarm threshold can be a ratio of the steady-state value of the acoustic parameter in the inner bore in the absence of gas influx to the steady state value of the acoustic parameter in the annulus in the absence of gas influx. Subsequent measurements can be compared to the gas influx alarm threshold in order to determine whether a gas influx has occurred.

The steady-state values of the acoustic parameter can be obtained by averaging acoustic parameter measurements taken in response to a plurality of pulses generated at the pulser 120. Since each activation of the pulser 120 generates a positive pressure pulse and a negative pressure pulse, the measurements used to form the average of the acoustic parameter for the inner bore corresponds to the measurements used to form the average of the acoustic parameter for the annulus.

The processor 142 stores various measurements of the work string, such as the location of the pulser 120 in the work string, the locations of the first and second inner bore sensors, the locations of the first and second annular sensor, the separation between the first and second inner bore sensors and the separation between the first and second annular sensors. The processor 142 determine various acoustic parameters of the fluid using these measurements as well as acoustic parameter measurements of the fluid based on pulses generated at the pulser 120. The processor 142 can further perform an action at the drill string when an alarm is generated based on the gas flux alarm threshold in order to react to the gas influx in the wellbore or to counteract the effects of the gas influx. Such actions can include, but are not limited to, stopping the drill string 102, activating the blow out preventer, stopping a flow of the drilling mud in the borehole, changing a flow rate of the drilling mud in the borehole, etc.

Figure 2:
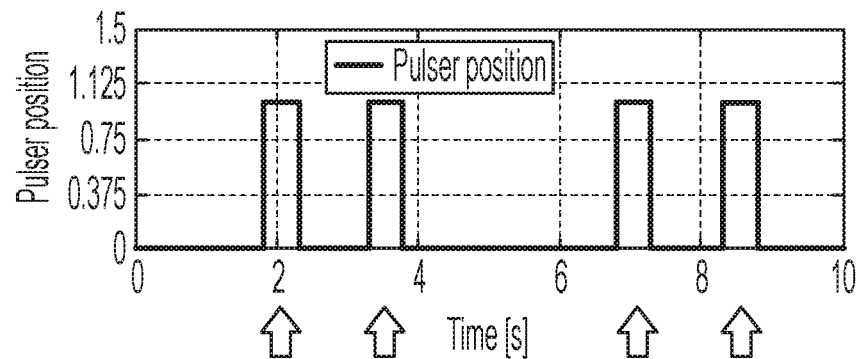
FIG. 2 shows an illustrative pulse sequence that can be generated by a pulser of the drilling system.
Figure 3:
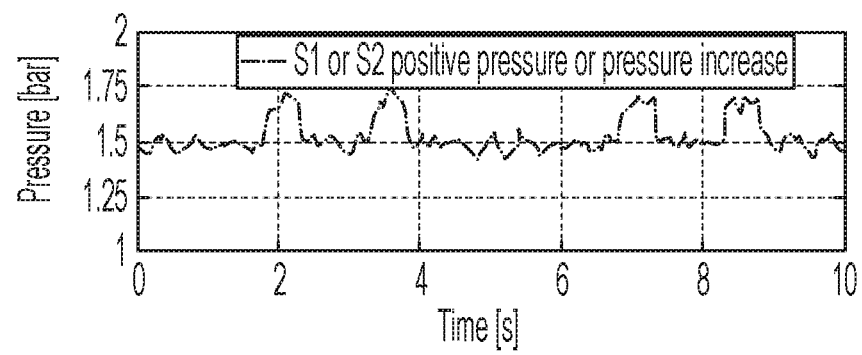
FIG. 3 shows pressure measurements obtained by inner bore sensors in response to the pulse sequence of FIG. 2.
Figure 4:
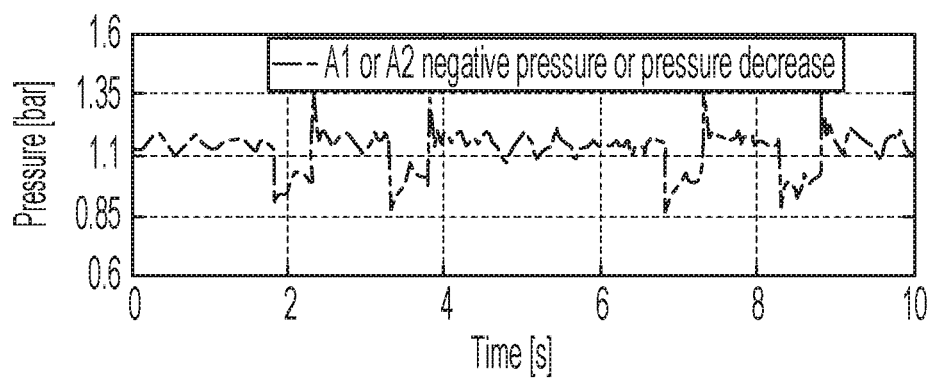
FIG. 4 shows pressure measurements obtained by annulus sensors in response to the pulse sequence of FIG. 2.

FIGS. 2 through 4 illustrate acoustic measurements that can be obtained from a pulse sequence generated at a pulser 120. FIG. 2 shows an illustrative pulse sequence that can be generated by the pulser 120. FIG. 3 shows pressure measurements obtained by inner bore sensors (S1 and S2) in response to the pulse sequence of FIG. 2. FIG. 4 shows pressure measurements obtained by annulus sensors (A1 and A2) in response to the pulse sequence of FIG. 2. The timing of the pulses in FIGS. 3 and 4 are adjusted for the travel time from the pulser 120 to the sensors, in order to align with the original pressure pulses of FIG. 2.

In one embodiment, the gas influx alarm threshold is based on a ratio of the speed of sound in the wellbore. The speed of sound in the annulus is affected by the appearance of gas in the annular fluid. Inner bore sensors (S1 & S2) can be used to determine a speed of sound in the inner bore 114. The processor 142 measure a time delay in the arrival time of the positive pressure pulse 122 at sensors S1 and S2. The speed of sound (m/second or ft/second) in the inner bore 114 can be determined from a difference between a time of arrival of the positive pressure pulse 122 at the first sensor S1 and a time of arrival of the positive pressure pulse 122 at the second sensor S2 (time(S2)−time(S1)) as well as the known distance between S1 and S2. Similarly, the annular pressure sensors (A1 and A2) can be used to determine a speed of sound in the annulus from the negative pressure pulse 124. Measurements can be obtained for a plurality of pressure pulses in the absence of a gas influx to determine an average speed of sound in both the inner bore and annulus. The gas influx alarm threshold can be based on a ratio of the average sound speeds. Subsequent speed of sound measurements can be used to form a speed of sound ratio that can be compared to the gas influx alarm threshold to indicate the presence of a gas influx. Similarly, the gas influx alarm threshold can be based on a ratio of signal attenuation measurements, a phase differences in an acoustic signal, and an arrival time of the acoustic signal at a sensor.

Figure 5:
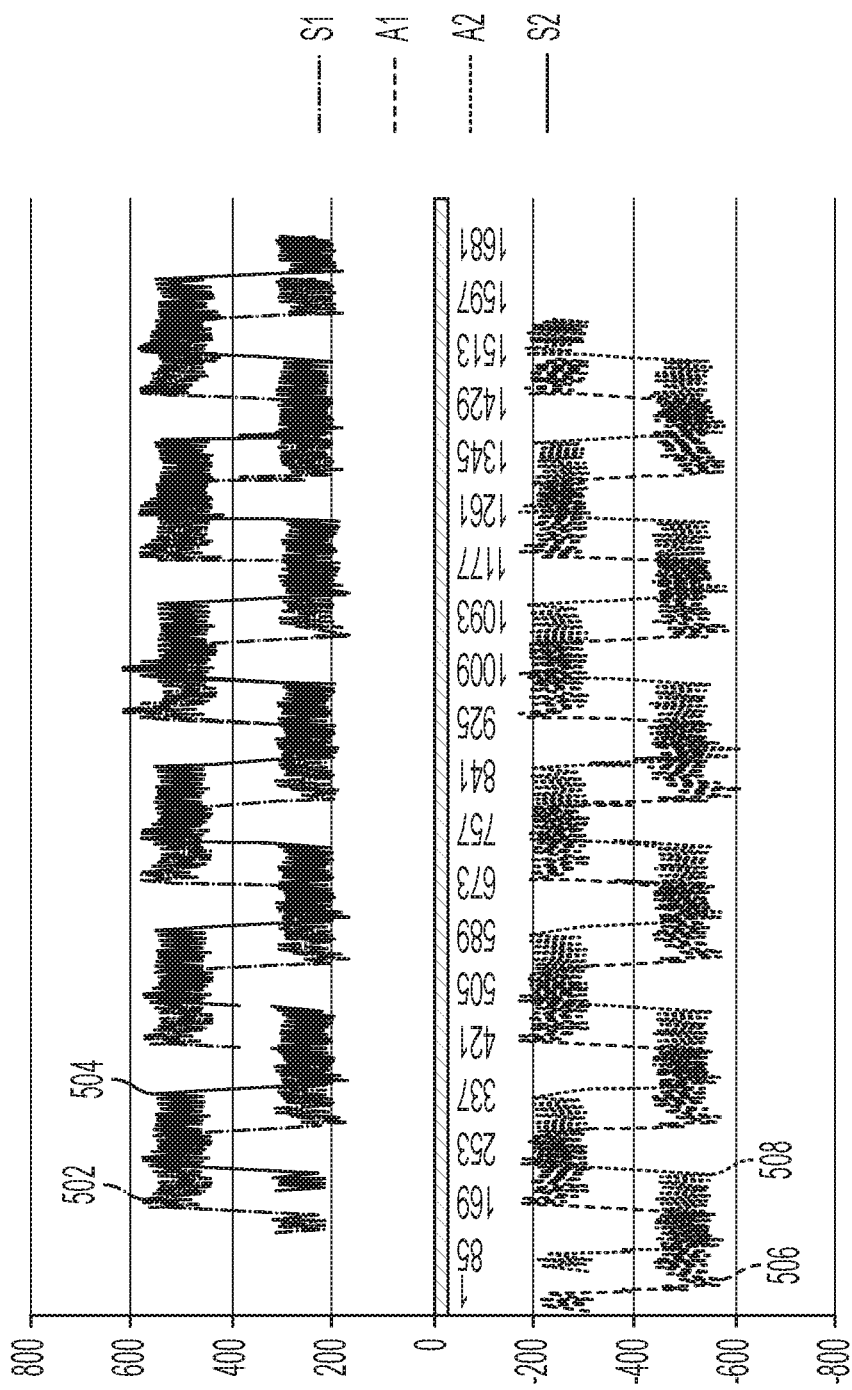
FIG. 5 shows pressure measurements obtained at inner bore sensors and annulus sensors in response to a continuous stream of fixed width pulses.

FIG. 5 shows pressure measurements obtained at inner bore sensors S1 (502) and S2 (504) as well as at annulus sensors A1 (506) and A2 (508) in response to a continuous stream of fixed width pulses. Signal processing for these measurements can include processing the signals separately (i.e., signals S1, S2, A1, A2). Alternatively, the inner bore sensor measurements can be processed to obtain a dual inner bore measurement (e.g., S2−S1) while the annulus sensor measurements can be processed to obtain a dual annulus measurement (e.g., A2-A1). Alternatively, the four measurements can be combined to obtain a Quad Transducer measurement (e.g., (S2−S1)+(A2−A1)). Various time shifts in the data are used to align measurements used in a comparison, such as for the dual inner bore measurement (e.g., S2−S1) dual annulus measurement (e.g., A2−A1) and Quad Transducer measurement (e.g., (S2−S1)+(A2−A1)).

Figure 6:
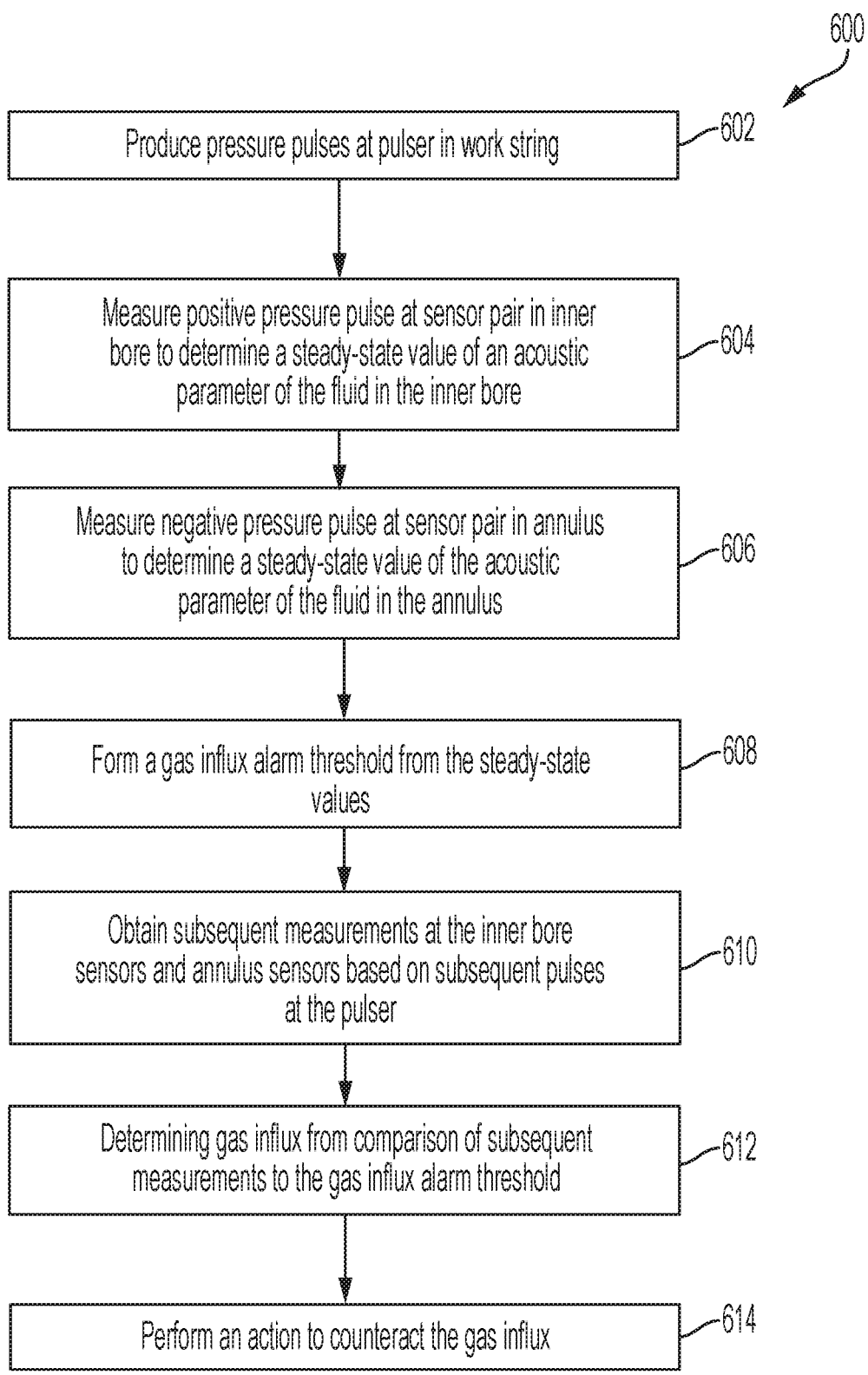
FIG. 6 shows a flowchart illustrating a method for detecting a gas influx in the wellbore.

FIG. 6 shows a flowchart illustrating a method for detecting a gas influx in the wellbore. In box 602, a pulser in the drill string is activated to generate a plurality of pressure pulses during a time period during which no gas influx is present. In box 604, measurements of the plurality of (positive) pressure pulses at pair of axially separated inner bore sensors are used to calculate a steady-state value for an acoustic parameter of the fluid in the inner bore 114 in the absence of a gas influx. In box 606, measurements of the plurality of (negative) pressure pulses at the axially separated annular sensors are used to calculate a steady-state value for an acoustic parameter of the fluid in the annulus. In box 608 a gas alarm influx threshold is formed from the steady-state values. In box 610 subsequent measurements are obtained at the inner bore sensors and annulus sensors in response to subsequent pulses generated at the pulser. In box 612, these measurements are compared to the gas influx alarm threshold in order to determine a gas influx in the wellbore. In box 614, an action is taken when a gas influx is detected.

When determining the average or mean values of the acoustic parameters, additional statistic can be also obtained such as variance or standard deviation of the measurements. Such standard deviations can be used to establish different thresholds for the gas influx alarm.

Set forth below are some embodiments of the foregoing disclosure:

Embodiment 1

A method of determining a gas influx into a wellbore. A gas influx alarm limit is set at a processor based on a steady-state value of an acoustic parameter of fluid in an inner bore of a work string in an absence of a gas influx and a steady-state value of the acoustic parameter of fluid in annulus outside of the work string in the absence of a gas influx. A gas influx in the wellbore is determined at the processor when a subsequent value of the acoustic parameter is outside of the alarm limit. The processor performs an action at the work string to counteract the gas influx in the wellbore.

Embodiment 2

The method of any prior embodiment, further comprising setting the gas influx alarm limit by generating a plurality of temporally spaced acoustic pulses at a pulser in the drill string, determining a steady-state value of the acoustic parameter in the inner bore from the plurality of temporally spaced acoustic pulses, and determining a steady-state value of the acoustic parameter in the annulus from the plurality of temporally spaced acoustic pulses.

Embodiment 3

The method of any prior embodiment, further comprising activating the pulser to generate a test pulse in the inner bore and the annulus to determine the subsequent value of the acoustic parameter.

Embodiment 4

The method of any prior embodiment, wherein activating the test pulse generates positive pressure pulse in the inner bore and a related negative pressure pulse in the annulus.

Embodiment 5

The method of any prior embodiment, further comprising setting the gas influx alarm threshold based on ratio of the steady-state value of the acoustic parameter in the inner bore in the absence of the gas influx to the steady-state value of the acoustic parameter in the annulus in the absence of a gas influx.

Embodiment 6

The method of any prior embodiment, wherein the steady-state value for the acoustic parameter in the inner bore is an average of the acoustic parameter values obtained in the inner bore in the absence of a gas influx in response to the plurality of pulses, and the steady-state value for the acoustic parameter in the annulus is an average of the acoustic parameter values obtained in the annulus in the absence of a gas influx in response to the plurality of pulses.

Embodiment 7

The method of any prior embodiment, further comprising sensing the acoustic parameter in the inner bore at a pair of inner bore sensors that are axially separated and sensing the acoustic parameter in the annulus at a pair of annulus sensors that axially separated.

Embodiment 8

The method of any prior embodiment, wherein the acoustic parameter is one of: (i) a signal attenuation of the fluid; (ii) a phase difference; (iii) an arrival time; and (iv) a sound velocity.

Embodiment 9

An apparatus for determining a gas influx into a wellbore. The apparatus includes a work string defining an inner bore area and an annulus area, a pair of inner bore sensors in the inner bore, a pair of annulus sensors in the annulus, and a processor configured to set a gas influx alarm limit based on a steady-state value of an acoustic parameter measured by the pair of inner bore sensors in an absence of a gas influx and a steady-state value of the acoustic parameter measured by the annulus sensors in the absence of the gas influx, determine a gas influx in the wellbore when a subsequent value of the acoustic parameter is outside of the alarm limit, and perform an action at the work string to counteract the gas influx in the wellbore.

Embodiment 10

The apparatus of any prior embodiment, further comprising a pulser in the work string configured to generate acoustic pulses, wherein the processor is further configured to set the gas influx alarm limit by determining the steady-state value of the acoustic parameter in the inner bore based on a plurality of acoustic parameter measurements received from the inner bore sensors in response to acoustic pulses generated at the pulser, and determining the steady-state value of the acoustic parameter in the annulus based on a plurality of acoustic parameter measurements received from the annulus sensors in response to the acoustic pulses generated at the pulser.

Embodiment 11

The apparatus of any prior embodiment, wherein the pulser is further configured to generate the test pulse.

Embodiment 12

The apparatus of any prior embodiment, wherein the pulser is configured to generate a positive pressure pulse in the inner bore and a related negative pressure pulse in the annulus when activated.

Embodiment 13

The apparatus of any prior embodiment, wherein the processor is further configured to set the gas influx alarm threshold based on ratio of the steady-state value of the acoustic parameter in the inner bore in the absence of the gas influx to the steady-state value of the acoustic parameter in the annulus in the absence of a gas influx.

Embodiment 14

The apparatus of any prior embodiment, wherein the steady-state value for the acoustic parameter in the inner bore is an average of the acoustic parameter values obtained in the inner bore in the absence of a gas influx in response to the plurality of pulses, and the steady-state value for the acoustic parameter in the annulus is an average of the acoustic parameter values obtained in the annulus in the absence of a gas influx in response to the plurality of pulses.

Embodiment 15

The apparatus of any prior embodiment, wherein the inner bore sensors includes a pair of axially-separated sensors the annulus sensors includes a pair of axially-separated sensors.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A method of determining a gas influx into a wellbore, comprising:
    generating a pressure pulse at a downhole location in a work string in the wellbore to generate a pressure pulse in an inner bore of the work string and a pressure pulse in an annulus outside of the work string in an absence of the gas influx in the wellbore;
    measuring a steady-state value of an acoustic parameter of fluid in the inner bore using an inner bore sensor in the inner bore and a steady-state value of the acoustic parameter of fluid in the annulus using an annulus sensor in the annulus;
    setting, at a processor, a gas influx alarm limit based on the steady-state value of the acoustic parameter of fluid in the inner bore in the absence of the gas influx and the steady-state value of the acoustic parameter of fluid in the annulus in the absence of the gas influx;
    determining, at the processor, the gas influx in the wellbore based on the alarm limit and a subsequently measured value of the acoustic parameter of fluid in the inner bore and a subsequently measured value of the acoustic parameter of fluid in the annulus; and
    performing, by the processor, an action at the work string to counteract the gas influx in the wellbore.

2. The method of claim 1, further comprising setting the gas influx alarm limit by:
    generating a plurality of temporally spaced pressure pulses;
    determining the steady-state value of the acoustic parameter of the fluid in the inner bore from the plurality of temporally spaced pressure pulses; and
    determining the steady-state value of the acoustic parameter of the fluid in the annulus from the plurality of temporally spaced pressure pulses.

3. The method of claim 2, wherein the steady-state value for the acoustic parameter of the fluid in the inner bore is an average of a plurality of acoustic parameter values obtained in the inner bore in the absence of a gas influx in response to the plurality of temporally spaced pressure pulses, and the steady-state value for the acoustic parameter of the fluid in the annulus is an average of a plurality of acoustic parameter values obtained in the annulus in the absence of a gas influx in response to the plurality of temporally spaced pressure pulses.

4. The method of claim 1, further comprising generating a subsequent pressure pulse to determine the subsequently measured value of the acoustic parameter of fluid in the inner bore and the subsequently measured value of the acoustic parameter of fluid in the annulus.

5. The method of claim 1 further comprising setting the gas influx alarm threshold based on a ratio of the steady-state value of the acoustic parameter of the fluid in the inner bore in the absence of the gas influx to the steady-state value of the acoustic parameter of the fluid in the annulus in the absence of a gas influx.

6. The method of claim 1, further comprising sensing the acoustic parameter in the inner bore at a pair of inner bore sensors that are axially separated and sensing the acoustic parameter in the annulus at a pair of annulus sensors that axially separated.

7. The method of claim 6, wherein the pair of inner bore sensors and the pair of annulus sensors are pressure sensors.

8. The method of claim 1, wherein the acoustic parameter is one of: (i) a signal attenuation of the fluid; (ii) a phase difference; (iii) an arrival time; and (iv) a sound velocity.

9. The method of claim 1, wherein the subsequently measured value of the acoustic parameter of the fluid in the inner bore and the subsequently measured value of the acoustic parameter of the fluid in the annulus are used to form a ratio, and the ratio is compared to the alarm limit.

10. An apparatus for determining a gas influx into a wellbore, comprising:
    a work string defining an inner bore area and an annulus area in the wellbore;
    a pulser at a downhole location in the work string;
    an inner bore sensor in the inner bore area;

an annulus sensor in the annulus area;
a processor configured to:
   activate the pulser in an absence of the gas influx in the wellbore to generate a pressure pulse in the inner bore area and a pressure pulse in the annulus area;
   measure a steady-state value of an acoustic parameter of fluid in the inner bore area and a steady-state value of the acoustic parameter of fluid in the annulus area;
   set a gas influx alarm limit based on the steady-state value of the acoustic parameter of fluid in the inner bore area measured by the inner bore sensor in the absence of the gas influx and the steady-state value of the acoustic parameter of fluid in the annulus area measured by the annulus sensor in the absence of the gas influx;
   determine the gas influx in the wellbore based on the alarm limit and a subsequently measured value of the acoustic parameter of fluid in the inner bore area and a subsequently measured value of the acoustic parameter of fluid in the annulus area; and
   perform an action at the work string to counteract the gas influx in the wellbore.

11. The apparatus of claim 10, wherein the pulse is configured to generate a plurality of temporally spaced pressure pulses and the processor is further configured to set the gas influx alarm limit by:
   determining the steady-state value of the acoustic parameter in the inner bore area based on a plurality of acoustic parameter measurements received from the inner bore sensor in response to the plurality of temporally spaced pulses generated at the pulser; and
   determining the steady-state value of the acoustic parameter in the annulus area based on a plurality of acoustic parameter measurements received from the annulus sensor in response to the plurality of temporally spaced pressure pulses generated at the pulser.

12. The apparatus of claim 11, wherein the pulser is further configured to generate a subsequent pressure pulse for determining the subsequently measured value of the acoustic parameter of fluid in the inner bore area and the subsequently measured value of the acoustic parameter of fluid in the annulus area.

13. The apparatus of claim 11, wherein the steady-state value for the acoustic parameter in the inner bore area is an average of a plurality of acoustic parameter values obtained in the inner bore area in the absence of a gas influx in response to the plurality of temporally spaced pressure pulses, and the steady-state value for the acoustic parameter in the annulus area is an average of the a plurality of acoustic parameter values obtained in the annulus in the absence of the gas influx in response to the plurality of temporally spaced pressure pulses.

14. The apparatus of claim 10, wherein the processor is further configured to set the gas influx alarm threshold based on a ratio of the steady-state value of the acoustic parameter in the inner bore area in the absence of the gas influx to the steady-state value of the acoustic parameter in the annulus area in the absence of the gas influx.

15. The apparatus of claim 10, wherein the inner bore sensor includes a pair of axially-separated sensors, and the annulus sensor includes a pair of axially-separated sensors.

16. The apparatus of claim 10, wherein the processor is further configured to form a ratio from the subsequently measured value of the acoustic parameter of fluid in the inner bore area and subsequently measured value of the acoustic parameter of fluid in the annulus area and compare the ratio to the alarm limit.

17. The apparatus of claim 10, wherein the inner bore sensor and the annulus sensor are pressure sensors.

* * * * *